(12) United States Patent
Horiguchi et al.

(10) Patent No.: US 9,695,265 B2
(45) Date of Patent: Jul. 4, 2017

(54) PROCESS FOR PRODUCING POLYACETAL COPOLYMER

(71) Applicant: Polyplastics Co., Ltd., Tokyo (JP)

(72) Inventors: Tadahiro Horiguchi, Fuji (JP); Eiji Masuda, Tokyo (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 15/119,561

(22) PCT Filed: Dec. 10, 2014

(86) PCT No.: PCT/JP2014/082630
§ 371 (c)(1),
(2) Date: Aug. 17, 2016

(87) PCT Pub. No.: WO2015/151342
PCT Pub. Date: Oct. 8, 2015

(65) Prior Publication Data
US 2017/0073451 A1    Mar. 16, 2017

(30) Foreign Application Priority Data

Mar. 31, 2014  (JP) .................. 2014-071309

(51) Int. Cl.
| | | |
|---|---|---|
| C08G 2/06 | (2006.01) | |
| C08G 2/10 | (2006.01) | |
| C08G 2/28 | (2006.01) | |
| C08G 2/04 | (2006.01) | |

(52) U.S. Cl.
CPC ................. *C08G 2/06* (2013.01); *C08G 2/04* (2013.01); *C08G 2/10* (2013.01); *C08G 2/28* (2013.01)

(58) Field of Classification Search
CPC .................................... C08G 2/05; C08G 2/06
USPC ......................................................... 528/234
See application file for complete search history.

(56) References Cited

U.S. PATENT DOCUMENTS

| | | | |
|---|---|---|---|
| 4,087,411 A | 5/1978 | Sugio et al. | |
| 4,751,272 A | 6/1988 | Okita et al. | |
| 5,726,276 A | 3/1998 | Nakai et al. | |
| 5,844,059 A | 12/1998 | Yamamoto et al. | |
| 5,886,139 A | 3/1999 | Yamamoto et al. | |
| 9,546,241 B2 | 1/2017 | Monma et al. | |
| 2016/0122459 A1 | 5/2016 | Monma et al. | |

FOREIGN PATENT DOCUMENTS

| | | |
|---|---|---|
| AU | 720117 B | 4/1998 |
| CN | 1165832 A | 11/1997 |
| CN | 1251799 A | 5/2000 |
| CN | 1406995 A | 4/2003 |
| EP | 0325052 | 7/1989 |
| JP | S55-042085 | 10/1980 |
| JP | S62-257922 | 11/1987 |
| JP | H01-170610 | 7/1989 |
| JP | H09-100329 | 4/1997 |
| JP | H09-278852 | 10/1997 |
| JP | H10-101756 | 4/1998 |
| JP | 2000-119356 | 4/2000 |
| JP | 2000-119357 | 4/2000 |
| JP | 2003-026746 | 1/2003 |
| WO | WO2014/175043 A1 | 10/2014 |

OTHER PUBLICATIONS

Extended European search report in European Patent Application No. 14888210.3, dated Feb. 17, 2017.
Office Action in Chinese Patent Application No. 201480073498.2, dated Dec. 1, 2016.

*Primary Examiner* — Duc Truong
(74) *Attorney, Agent, or Firm* — Knobbe Martens Olson & Bear LLP

(57) ABSTRACT

A process for producing a polyacetal copolymer, the process making catalyst deactivation easy and efficient. Trioxane as a major monomer is copolymerized with one or more comonomers that are a cyclic ether and/or cyclic formal having at least one carbon-carbon bond, using a nonvolatile protonic acid as a polymerization catalyst at 100° C. or lower until the conversion reaches 50% and thereafter at a polymerization environment temperature of 115° C. to 140° C. This process includes: a crushing step in which a dry-process crusher is used to obtain a crude polyacetal copolymer crushed to such a degree that when the crude copolymer is screened with a sieve having an opening size of 11.2 mm, 90 parts by weight or more thereof passes therethrough; and a deactivation step in which a basic compound (e) is added to the crude copolymer and the mixture is melt-kneaded to thereby deactivate the polymerization catalyst.

11 Claims, No Drawings

PROCESS FOR PRODUCING POLYACETAL COPOLYMER

This application is the U.S. National Phase under 35 U.S.C. §371 of International Application PCT/JP2014/082630, filed Dec. 10, 2014, designating the U.S., and published in Japanese as WO 2015/151342 on Oct. 8, 2015, which claims priority to Japanese Patent Application No. 2014-071309, filed Mar. 31, 2014, the entire contents of which are incorporated herein by reference.

TECHNICAL FIELD

The present invention relates to a method of manufacturing a polyacetal copolymer.

BACKGROUND ART

As a conventional method of manufacturing a polyacetal (POM) copolymer, the cation copolymerization is known in which trioxane and a cyclic ether and/or cyclic formal having at least one carbon-carbon bond are used as a main monomer and a comonomer, respectively. Cationic active catalysts used for the above copolymerization may include Lewis acid, in particular, halides of boron, tin, titanium, phosphorus, arsenic and antimony, for example, boron trifluoride, tin tetrachloride, titanium tetrachloride, phosphorus pentachloride, phosphorus pentafluoride, arsenic pentafluoride and antimony pentafluoride, and compounds such as complexes or salts thereof: protonic acid, for example, perchloric acid; esters of protonic acid, in particular, esters of perchloric acid and lower aliphatic alcohol, for example, tert-butyl perchlorate ester; anhydrides of protonic acid, in particular, mixed anhydrides of perchloric acid and lower aliphatic carboxylic acid, for example, acetyl perchlorate, or trimethyloxonium hexafluorophosphate, triphenyl-methyl-hexafluoro alzenate, acetyl tetrafluoroborate, acetyl hexafluorophosphate, acetyl hexafluoro alzenate and the like. Among these, boron trifluoride, or coordination complexes of boron trifluoride and organic compounds, for example, ethers are the most common catalysts for polymerization in which trioxane is used as a main monomer, and they are widely used in industries.

However, in the case of the commonly used polymerization catalysts such as boron trifluoride-based compounds, a relatively large amount of catalyst (for example, 40 ppm or more relative to the total monomers) is required for polymerization. Therefore, sufficient catalyst deactivation treatment may not easily be performed after polymerization. Further, even in a case where a catalyst is successfully deactivated, substances from the catalyst may remain in a copolymer, causing problems such as promoted decomposition of the copolymer. Moreover, the catalyst deactivation process is usually performed in a large amount of an aqueous solution containing a basic compound such as triethylamine, and requires complicated steps such as separating a copolymer from a process liquid for drying after catalyst deactivation and collecting unreacted monomers dissolved in the process liquid, which are economically disadvantageous.

In order to avoid complicated steps associated with the catalyst deactivation treatment described above, proposed are methods comprising adding a trivalent phosphorus compound to a copolymer produced (for example, see Patent Document 1 and the like) and methods comprising adding a hindered amine compound (see Patent Document 2 and the like). Nonetheless, satisfactory effects have not been obtained.

Meanwhile, methods of manufacturing a polyacetal copolymer in which a heteropolyacid is used as a catalyst have been proposed (for example, see Patent Document 3 and the like). Further, methods of manufacturing a polyacetal copolymer have been proposed, the methods comprising: preparing a crude polyacetal copolymer by performing copolymerization using a heteropolyacid as a catalyst; then adding at least one solid basic compound selected from triazine ring-containing compounds and polyamides having amino groups or substituted amino groups to the reaction product; and performing melt-kneading treatment to deactivate the catalyst (for example, see Patent Document 4 and the like). According to the above methods, polymerization can be achieved with a very small catalytic amount because a heteropolyacid is highly active, and thus can provide a high quality polyacetal copolymer. Further, complicated steps as described above are not required because catalyst deactivation can be performed by melt-kneading treatment with essentially no solution, showing an economical advantage.

Patent Document 1: Japanese Examined Patent Application Publication No. S55-42085

Patent Document 2: Japanese Unexamined Patent Application Publication No. S62-257922

Patent Document 3: Japanese Unexamined Patent Application Publication No. H01-170610

Patent Document 4: Japanese Unexamined Patent Application, Publication No. 2003-026746

DISCLOSURE OF THE INVENTION

Problems to be Solved by the Invention

In recent years, there have been demands for a high quality polyacetal copolymer having particularly excellent thermal stability and releasing a very small amount of formaldehyde. However, the methods described in Patent Documents 1 to 4 cannot fully satisfy the above demands. In order to meet the above demands, further improvements are required such as more efficient catalyst deactivation and the like.

An objective of the present invention is to provide a polyacetal copolymer having a high polymerization yield, a less amount of unstable terminal ends, good thermal stability, a less amount of released formaldehyde and even an excellent melt index and hue by appropriately selecting monomers, a polymerization catalyst for use in polymerization, polymerization conditions and a deactivating agent for deactivating the polymerization catalyst in an operationally simple process where a polymerization catalyst is conveniently and efficiently deactivated, and washing equipment is not required.

Means for Solving the Problems

To achieve the above objective, the present inventors have conducted extensive studies about the types of monomers, polymerization catalysts and deactivating agents for deactivating polymerization catalysts as well as methods of polymerization and catalyst deactivation using these. As a result, the present inventors find that in a process of preparing a polyacetal copolymer using trioxane as a main monomer, a cyclic ether and/or formal having at least one carbon-carbon bond as a comonomer, a nonvolatile protonic acid as a catalyst and a basic compound as a deactivating agent, the process comprising copolymerizing the main monomer and the copolymer under predetermined conditions; grinding the resulting copolymer; deactivating the polymerization catalyst in a group of copolymer particles having particle sizes of a certain value or less; and providing the group as the polyacetal copolymer, the catalyst can reliably and rapidly be deactivated in a very small quantity even though the catalyst has a high polymerization activity, and unstable termini can also be reduced/stabilized. Further the present inventors find that the above polyacetal copolymer is of high quality, having very high thermal stability and releasing a very small amount of formaldehyde. In addition, the present inventors find that the above polyacetal copolymer can be obtained from an operationally simple process where the polymerization catalyst can conveniently and efficiently be deactivated, and washing equipment for washing the polymer is not required. More specifically, the present invention provides the followings.

(1) The present invention provides a method of manufacturing a polyacetal copolymer, the method comprising: a copolymerization step of copolymerizing trioxane as a main monomer (a) and a cyclic ether and/or formal having at least one carbon-carbon bond as a comonomer (b) in the presence of a nonvolatile protonic acid as a polymerization catalyst (c) to obtain a crude polyacetal copolymer (d1), a grinding step of obtaining a crude polyacetal copolymer (d2) using a dry grinder mill, the crude polyacetal copolymer (d2) having a through-sieve proportion of 90 parts by weight or more when screened with a sieve having an opening of 11.2 mm, a deactivation step of deactivating the polymerization catalyst (c) by adding a basic compound (e) to the post-ground crude polyacetal copolymer (d2), and melt-kneading the mixture to obtain a polymerization catalyst-deactivated polyacetal copolymer (d3).

(2) Further, the present invention provides the method of manufacturing a polyacetal copolymer according to (1), wherein the nonvolatile protonic acid comprises at least one selected from heteropolyacids, isopolyacids or acid salts thereof.

(3) Further, the present invention provides the method of manufacturing a polyacetal copolymer according to (2), wherein the nonvolatile protonic acid comprises a heteropolyacid represented by the following general formula (1) or an acid salt thereof:

$$H_x[M_m \cdot M'_n O_l] \cdot yH_2O \qquad (1)$$

wherein in the general formula (1), M represents a central element selected from P and/or Si, and M' represents one or more coordinating elements selected from W, Mo and V; and l is 10 to 100, and m is 1 to 10, and n is 6 to 40, and x is 1 or more, and y is 0 to 50.

(4) Further, the present invention provides the method of manufacturing a polyacetal copolymer according to (2) or (3), the heteropolyacid or an acid salt thereof comprises at least one compound selected from phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid or acid salts thereof.

(5) Further, the present invention provides the method of manufacturing a polyacetal copolymer according to (2), wherein the nonvolatile protonic acid comprises an isopolyacid represented by the following general formula (2) or (3) or an acid salt thereof:

$$xM^I_2O \cdot pM^V_2O_6 \cdot yH_2O \qquad (2)$$

$$xM^I_2O \cdot pM^{VI}_2O_6 \cdot yH_2O \qquad (3)$$

wherein in the general formula (2) and (3), $M^I$ represents hydrogen optionally replaced with a metal in some occurrences; $M^V$ represents one or more elements selected from V, Nb and Ta in the V group of the periodic table; $M^{VI}$ represents one or more elements selected from Cr, Mo, W and U of the VI group in the periodic table; and p and x are 1 or more, and y is 0 to 50.

(6) Further, the present invention provides the method of manufacturing a polyacetal copolymer according to (2) or (5), wherein the isopolyacid or an acid salt thereof comprises at least one compound selected from paratungstic acid, metatungstic acid, paramolybdic acid, metamolybdic acid, paravanadic acid, metavanadic acid or acid salts thereof.

(7) Further, the present invention provides the method of manufacturing a polyacetal copolymer according to any one of (1) to (6), wherein the comonomer (b) comprises at least one selected from 1,3-dioxolane, diethylene glycol formal, 1,4-butanediol formal, 1,3-dioxane or ethyleneoxide.

(8) Further, the present invention provides the method of manufacturing a polyacetal copolymer according to any one of (1) to (7), wherein the basic compound (e) comprises at least one selected from triazine ring-containing compounds having amino groups or substituted amino groups; carbonate, hydrogencarbonate or carboxylate salts of alkali metal elements or alkali earth metal elements or hydrates thereof.

(9) Further, the present invention provides the method of manufacturing a polyacetal copolymer according to (8), wherein the carbonate, hydrogencarbonate or carboxylate salt of an alkali metal element or an alkali earth metal element or a hydrate thereof comprises at least one selected from sodium formate, sodium acetate, sodium carbonate, sodium hydrogen carbonate, disodium succinate, sodium laurate, sodium palmitate, sodium stearate or calcium stearate.

(10) Further, the present invention provides the method of manufacturing a polyacetal copolymer according to any one of (1) to (9), wherein the post-ground crude polyacetal copolymer (d2) has a content of moisture of 0.1 parts by weight or less and a content of unreacted trioxane of 1.0 part by weight or less.

(11) Further, the present invention provides the method of manufacturing a polyacetal copolymer according to any one of (1) to (10), wherein the amount of formaldehyde released from the polymerization catalyst-deactivated polyacetal copolymer (d3) is 100 ppm or less, and the b value of the polymerization catalyst-deactivated polyacetal copolymer is 2.0 or less as measured with a color-difference meter.

Effects of the Invention

According to the present invention, the content of unreacted trioxane and the particle diameter of a crude polyacetal copolymer can be controlled within certain ranges when a nonvolatile protonic acid is used as a polymerization catalyst. Further, melt-kneading of a crude polyacetal copolymer in the presence of a basic compound as a deactivating agent for a polymerization catalyst not only can deactivate the polymerization catalyst but also can stabilize unstable termini of the crude polyacetal copolymer. As a result, a high quality polyacetal copolymer with excellent thermal stability and very little formaldehyde formation can be manufactured in a low cost and simple manufacturing process.

Further, according to the present invention, unstable terminal ends can also be stabilized after a rapid and complete deactivation of a polymerization catalyst in a highly streamlined process in which the deactivation step is simplified, and the washing step is omitted by use of the dry deactivating method as compared with the conventional wet deactivating method. As a result, a superior quality polyacetal copolymer having thermal stability, very few unstable terminal ends and a very small amount of released formaldehyde can be manufactured at low cost without showing any defects such as decomposition and denaturation due to a catalyst.

PREFERRED MODE FOR CARRYING OUT THE INVENTION

Below, specific embodiments of the present invention will be described in detail, but the present invention shall not be limited to the following embodiments in any sense. The present invention can be implemented with appropriate modifications without departing from the scope of the present invention.
<Method of Manufacturing Polyacetal Copolymer>

An embodiment of the present invention comprises a copolymerization step of copolymerizing a main monomer (a) and a comonomer (b) to obtain a pre-ground crude polyacetal copolymer (d1), a grinding step of grinding the above crude polyacetal copolymer (d1) with a dry grinder mill to obtain a post-ground crude polyacetal copolymer (d2), and a deactivation step of deactivating a polymerization catalyst (c) by adding a basic compound (e) to the post-ground crude polyacetal copolymer (d2), and melt-kneading the mixture to obtain a polymerization catalyst-deactivated polyacetal copolymer (d3).
[Copolymerization Step]

The copolymerization step involves copolymerizing trioxane as a main monomer (a) and a cyclic ether and/or formal having at least one carbon-carbon bond as a comonomer (b) in the presence of a nonvolatile protonic acid as a polymerization catalyst (c) to obtain a crude polyacetal copolymer (d1).
[Main Monomer (a)]

Trioxane (1,3,5-trioxane) may be used as a main monomer (a). Trioxane may be obtained when 3 molecules of formaldehyde are bonded together by an action of an acid.
[Comonomer (b)]

A compound (b) selected from cyclic ethers and formals each having at least one carbon-carbon bond may be used as a comonomer. Representative examples of the compound (b) used as a comonomer may include, for example, 1,3-dioxolane, diethylene glycol formal, 1,4-butanediol formal, 1,3-dioxane, ethyleneoxide, propylene oxide, epichlorohydrin and the like. Among these, in view of the stability of polymerization, preferred are 1,3-dioxolane, diethylene glycol formal, 1,4-butanediol formal, 1,3-dioxane, ethylene oxide and the like. Further, a cyclic ester, for example, β-propiolactone; a vinyl compound, for example, styrene; and the like may also be used. Moreover, monofunctional cyclic ethers and formals each having a substituent unit, such as butyl glycidyl ether, 2-ethylhexyl glycidyl ether can be used as a comonomer. Furthermore, the followings may also be used as a comonomer: a compound having two polymerizable cyclic ether or formal groups such as a diglycidyl ether and diformal of alkylene glycol, for example, butanediol dimethylidene glyceryl ether, butanediol diglycidyl ether and the like; a compound having three or more polymerizable cyclic ether or formal groups, such as glycerol triglycidyl ether, trimethylolpropane triglycidyl ether and pentaerythritol tetraglycidyl ether. Polyacetal copolymers in which branching structures and cross-linked structures are formed by this also fall within the scope of the present invention.

According to the present invention, the amount of a compound (b) used as a comonomer selected from cyclic ethers and formals is 0.1 to 20 mol %, preferably 0.2 to 10 mol % relative to the total monomers (the total amount of the main monomer and the comonomer). An amount of less than 0.1 mol % is not preferred because the amount of the unstable terminal ends of a crude polyacetal copolymer produced by polymerization is increased, resulting in decreased stability. On the other hand, an excessive amount of a comonomer is not preferred because the resulting copolymer is softened, resulting in a decreased melting point.
[Polymerization Catalyst (c)]

A nonvolatile protonic acid may be used as a polymerization catalyst (c). According to the present invention, a nonvolatile protonic acid is used as a polymerization catalyst instead of a boron trifluoride-based catalyst. Therefore, the polymerization conversion percentage can be increased as compared with a case where a boron trifluoride-based catalyst is used as a polymerization catalyst.

Examples of the nonvolatile protonic acid may include compounds comprising at least one selected from heteropolyacids, isopolyacids or acid salts thereof. A heteropolyacid refers to a polyacid which may be generated by subjecting different oxygen acids to dehydration-condensation, and has a specific heteroelement present at the center and a mono- or bi-nuclear complex ion which may be created when condensable acid groups are condensed by sharing an oxygen atom. An isopolyacid, which is also referred to as an iso-polyacid, a homonuclear condensed acid or a homopolyacid, refers to a high molecular weight inorganic oxygen acid comprising a condensation product of an inorganic oxygen acid having a single kind of V or VI-valent metal.
(Heteropolyacid or Acid Salt Thereof)

First, a heteropolyacid or an acid salt thereof will be described in detail. A heteropolyacid or an acid salt thereof can be represented by the general formula (1):

$$H_x[M_m \cdot M'_n O_l] \cdot y H_2O \qquad (1)$$

A heteropolyacid in which the central element M in the above composition formula represents at least one element selected from P and/or Si, and the coordinating element M' represents one or more elements selected from W, Mo and V is particularly effective as a polymerization catalyst for use in the present invention. In view of the polymerization activity, the coordinating element M' is more preferably W or Mo. Further, in the general formula (1), l is 10 to 100, and m is 1 to 10, and n is 6 to 40, and x is 1 or more, and y is 0 to 50.

Moreover, acid salts in which $H_x$ in the general formula (1) is replaced with various metals and the like may also be used as catalysts for use in the present invention.

Specific examples of the heteropolyacid may include, for example, phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstentovanadic acid and the like. In particular, in view of the polymerization activity, the heteropolyacid is preferably selected from silicomolybdic acid, silicotungstic acid, phosphomolybdic acid and phosphotungstic acid.

Further, the α0, βII and βIv types of heteropolyacids are generally known, and in view of the polymerization activity, the α0 and βIV types are preferred, and the α0 type is particularly preferred.

(Isopolyacid or Acid Salt Thereof)

Next, isopolyacids or acid salts thereof will be described in detail. Isopolyacids or acid salts thereof can be represented by the general formula (2) or (3):

$$xM^I_2O \cdot pM^V_2O_6 \cdot yH_2O \quad (2)$$

$$xM^I_2O \cdot pM^{VI}_2O_6 \cdot yH_2O \quad (3)$$

wherein in the general formulas (2) and (3), $M^I$ represents hydrogen optionally replaced with a metal in some occurrences. $M^V$ represents one or more elements selected from V, Nb and Ta of the V group in the periodic table. $M^{VI}$ represents one or more elements selected from Cr, Mo, W and U of the VI group in the periodic table. p and x are 1 or more, and y is 0 to 50.

An isopolyacid may be prepared by various methods such as a method in which a solution of an isopolyacid salt is treated with an ion exchange resin and a method in which a mineral acid is added to a concentrated solution of an isopolyacid salt, and then ether extraction is performed. Note that in the present invention, not only an isopolyacid but also an acid salt of an isopolyacid can be used as a polymerization catalyst. Any isopolyacid salt represented by the above general formula (2), (3) may be used, but in view of the polymerization activity, an isopolyacid represented by the general formula (3) or an acid salt thereof is preferred.

Specific examples of a preferred isopolyacid may include isopolytungstic acid such as paratungstic acid, metatungstic acid; isopolymolybdic acid such as paramolybdic acid, metamolybdic acid; meta-polyvanadic acid, isopolyvanadic acid and the like. Among these, isopolytungstic acid is preferred in view of the polymerization activity.

(Solvent)

Preferably, a nonvolatile protonic acid is diluted with an inert solvent which does not show any deleterious effect on polymerization, and then added to trioxane and/or a comonomer in order to achieve a uniform polymerization reaction. Inert solvents may preferably include, but not limited to, esters obtainable by condensation of a low molecular weight carboxylic acid having 1 to 10 carbon atoms, such as formic acid, acetic acid, propionic acid and butyric acid and a low molecular weight alcohol having 1 to 10 carbon atoms, such as methanol, ethanol, 1-propanol, 2-propanol, 1-butanol, 2-butanol, 2-methyl-1-propanol, 2-methyl-2-propanol, 1-pentanol, 3-methyl-1-butanol and 1-hexanol; low molecular weight ketones having 1 to 10 carbon atoms such as acetone, 2-butanone, 2-pentanone, 3-pentanone, 2-hexanone, 3-hexanone, methyl isobutyl ketone and methyl-t-butyl ketone. Considering industrial availability and the like, methyl formate, ethyl formate, methyl acetate, ethyl acetate, butyl acetate, acetone, 2-butanone, methyl isobutyl ketone and the like are most suitable. A polymerization catalyst may be dissolved in the above inert solvent to a concentration of 1 to 30 weight/parts by weight, the concentration is not limited to that. Further, a method is also preferred in which a predetermined amount of a nonvolatile protonic acid is pre-mixed with any one or more of trioxane, a comonomer, a molecular weight modifier and the like in their partial or entire amounts, and the resulting solution is added to a polymerization system to perform polymerization.

There is no particular limitation for the amount of the polymerization catalyst (c), but it is preferably 0.1 ppm or more and 50 ppm or less relative to the total amount of entire monomers, and more preferably 0.1 ppm or more and 10 ppm or less.

A too small amount of the polymerization catalyst (c) is not preferred because the content of unreacted trioxane remained in a crude polyacetal copolymer will be more than 1.0 part by weight, and a high polymerization yield cannot be obtained. Further, a content of unreacted trioxane remained in a crude polyacetal copolymer of more than 1.0 part by weight is not preferred because even after stabilizing unstable termini of the crude polyacetal copolymer, the thermal stability, the amount of released formaldehyde and the melt index of the stabilized polyacetal copolymer may be less than satisfactory. Moreover, the b value may also be high for the hue of pellets of the stabilized polyacetal copolymer.

On the other hand, a too large amount of the polymerization catalyst (c) is not preferred because a decomposition reaction may proceed.

[Preparation of Pre-Ground Crude Polyacetal Copolymer (d1)]

In the present invention, polymerization for preparing a crude polyacetal copolymer may be performed by methods and with facilities similar to those used in the publicly known copolymerization of trioxane. That is, any of batch, continuous and half-continuous processes may be used, and a method in which a liquid monomer is used, and a powdered or aggregated solid polymer is obtained as polymerization proceeds is commonly used. In the case of batch processes, a polymerization apparatus which can be used in the present invention may be a commonly used reaction vessel with a stirrer. Alternatively, in the case of continuous processes, co-kneaders, twin-screw continuous extruder mixers, twin-paddle continuous mixers and other apparatuses previously described for continuous polymerization of trioxane. In addition, two or more different types of polymerization machines may be used in combination.

There is no particular limitation for the polymerization method, but a method is more suitable in which trioxane, a comonomer and a heteropolyacid as a polymerization catalyst are pre-mixed while maintaining the liquid phase state, and the resulting raw material mixture is fed into a polymerization apparatus to perform a copolymerization reaction as previously described. This method is advantageous because the requisite amount of a catalyst can be reduced, and thus a polyacetal copolymer releasing a less amount of formaldehyde can be obtained.

The polymerization temperature is preferably such that the polymerization environmental temperature is maintained at 100° C. or less until the conversion percentage reaches 50%, and thereafter in a temperature range of between 115° C. or more and 140° C. or less. A polymerization temperature of less than 115° C. is not preferred because the content of unreacted trioxane remained in a crude polyacetal copolymer will be more than 1.0 part by weight, and a high polymerization yield cannot be obtained. A content of unreacted trioxane remained in a crude polyacetal copolymer of more than 1.0 part by weight is not preferred because even after stabilizing unstable termini of the crude polyacetal copolymer, the thermal stability, the amount of released formaldehyde and the melt index of the stabilized polyacetal copolymer may be less than satisfactory. Moreover, the b value may also be high for the hue of pellets of the stabilized polyacetal copolymer.

In a case where the polymerization temperature is more than 140° C., efficient production of a polyacetal copolymer is difficult due to a proceeded decomposition reaction.

In the present invention, when polymerizing the main monomer (a) and the comonomer (b) described above to prepare a polyacetal copolymer, a known chain transfer agent, for example, a low molecular weight linear acetal such as methylal can be added to control the degree of polymerization.

Further, the polymerization reaction is preferably performed essentially in the absence of impurities containing active hydrogens, for example, water, methanol and formic acid. For example, it is preferably performed under conditions where impurities are each present in an amount of 10 ppm or less. To this end, trioxane and a cyclic ether and/or formal which have been prepared so as to minimize these impurity components as much as possible are preferably used as a main monomer and a comonomer.

[Grinding Step]

Next, the grinding step will be described. The grinding step involves grinding a pre-ground crude polyacetal copolymer (d1) with a dry grinder mill to obtain a post-ground crude polyacetal copolymer (d2). The particle diameter of the post-ground crude polyacetal copolymer (d2) is such that the through-sieve proportion is 90 parts by weight or more when screened with a sieve having an opening of 11.2 mm. Common dry grinder mills, in particular including jet-type, hammer-type, ball-type, roll-type, rod-type, feather-type grinders and the like may be used in order to achieve the above particle diameter.

In a case where a pre-ground crude polyacetal copolymer (d1) is not be ground, the content of the group of particles each having a particle diameter of more than 11.2 mm in a raw material to which a basic compound (e) is to be added in the deactivation step described below may be more than 10 parts by weight relative to the total raw material. Therefore, even if the basic compound (e) is added to the crude polyacetal copolymer to deactivate the polymerization catalyst (c) and also to stabilize unstable termini of the crude polyacetal copolymer, the thermal stability, the amount of released formaldehyde and the melt index of the stabilized polyacetal copolymer may be less than satisfactory. Therefore, this is not preferred. Moreover, the b value may also be high for the hue of pellets of the stabilized polyacetal copolymer.

[Post-Ground Crude Polyacetal Copolymer (d2)]

In the present invention, the post-ground crude polyacetal copolymer (d2) has a moisture content of 0.1 parts per weight or less, a content of unreacted trioxane of 1.0 part by weight or less and a through-sieve proportion of 90 parts by weight or more as determined by screening with a sieve having an opening of 11.2 mm.

The content of unreacted trioxane will not be controlled within the above range if the copolymerization temperature in the copolymerization step is not properly maintained. The particle diameter of the post-ground crude polyacetal copolymer (d2) will not be controlled within the above range if the crude polyacetal copolymer after copolymerization is not properly ground. The content of moisture may be controlled within the above range by avoiding penetration of moisture from the external environment. Further, the amount of unstable termini will be within the above range only in the case of a crude polyacetal copolymer before a polyacetal copolymer is subjected to stabilizing treatment.

(Content of Unreacted Trioxane)

The content of unreacted trioxane is 1.0 part by weight or less relative to 100 parts by weight of the polyacetal copolymer, preferably 0.7 parts by weight or less, and more preferably 0.5 parts by weight or less. A content of unreacted trioxane of more than 1.0 part by weight is not preferred because even after stabilizing unstable termini of the crude polyacetal copolymer, the thermal stability, the amount of released formaldehyde and the melt index of the stabilized polyacetal copolymer may be less than satisfactory. Moreover, the b value may also be high for the hue of pellets of the stabilized polyacetal copolymer.

(Grinding)

The through-sieve proportion when screened with a sieve having an opening of 11.2 mm is 90 parts by weight or more, preferably 95 parts by weight or more relative to 100 parts by weight of a sample subjected to screening. A value of the above proportion of less than 90 parts by weight is not preferred because even if the basic compound (e) is added to the crude polyacetal copolymer to deactivate the polymerization catalyst (c) and also to stabilize unstable termini of the crude polyacetal copolymer, the thermal stability, the amount of released formaldehyde, and the melt index of the stabilized polyacetal copolymer may be less than satisfactory. Moreover, the b value may also be high for the hue of pellets of the stabilized polyacetal copolymer.

(Amount of Unstable Termini)

In the present invention, the amount of unstable termini of the post-ground crude polyacetal copolymer (d2) is more than 0.5 parts by weight. The amount of unstable termini of 0.5 parts by weight or less means that a certain stabilizing treatment has been performed on the polyacetal copolymer (d2).

Examples of unstable termini include the amounts of hemiacetal terminal groups, formyl terminal groups and the like. Further, in the present invention, the amount of unstable termini (the amount of unstable portions of the terminal ends) is evaluated by the following approaches.

About 1 g of crude oxymethylene copolymer is precisely weighed, and placed into a pressure tight container along with 100 ml of 60 vol % aqueous methanol containing 15 mg of calcium hydroxide and 0.5 vol % ammonium hydroxide, and heated at 170° C. for 60 minutes, and then cooled and opened to remove the content. The amount of formaldehyde produced due to decomposition of unstable terminal portions and dissolved in the solution is quantified in accordance with JIS JISK0102.29.1, the absorptiometric method for acetyl acetone, to calculate a proportion in terms of parts by weight relative to the crude oxymethylene copolymer.

[Deactivation Step]

Next, the deactivation step will be described. The deactivation step involves adding a basic compound (e) to the post-ground crude polyacetal copolymer (d2), and melt-kneading the mixture to deactivate the polymerization catalyst (c), thereby obtaining a polymerization catalyst-deactivated polyacetal copolymer (d3).

[Basic Compound (e)]

There is no particular limitation for the basic compound (e), but the basic compound (e) preferably comprises at least one selected from triazine ring-containing compounds having amino groups or substituted amino groups; and carbonate, hydrogencarbonate or carboxylate salts of alkali metal elements or alkali earth metal elements or hydrates thereof in view of that the basic compound (e) may be directly added to the post-ground crude polyacetal copolymer (d2) without washing the post-ground crude polyacetal copolymer (d2) to deactivate the polymerization catalyst (c) and also to stabilize unstable termini of the post-ground crude polyacetal copolymer (d2). Further, the carbonate, hydrogencarbonate or carboxylate salt of an alkali metal element or an alkali earth metal element or a hydrate thereof preferably comprises at least one selected from sodium formate, sodium acetate, sodium carbonate, sodium hydrogencarbonate, disodium succinate, sodium laurate, sodium palmitate, sodium stearate or calcium stearate.

(Triazine Ring-Containing Compound Having an Amino Group or a Substituted Amino Group; a Carbonate, Hydrogencarbonate or Carboxylate Salt of an Alkali Metal Element or an Alkali Earth Metal Element or a Hydrate Thereof)

The present invention is characterized by that at least one selected from triazine ring-containing compounds having amino groups or substituted amino groups; carbonate, hydrogencarbonate or carboxylate salts of alkali metal elements or alkali earth metal elements or hydrates thereof is added to a polyacetal copolymer (a crude polyacetal copolymer) which is obtained by performing copolymerization as described above, and contains a polymerization catalyst, and further has unstable portions at the terminal ends thereof; and then melt-kneading is performed to deactivate the polymerization catalyst and also to reduce the unstable termini for stabilization. Hereafter, the "triazine ring-containing compounds having amino groups or substituted amino groups; carbonate, hydrogencarbonate or carboxylate salts of alkali metal elements or alkali earth metal elements or hydrates thereof" are also referred to the (e) components. The aforementioned stabilizing treatment can be performed conveniently and effectively by directly adding at least one of the (e) components to the crude polyacetal copolymer obtained by a copolymerization reaction without washing.

The above triazine ring-containing compounds having amino groups or substituted amino groups may preferably include melamine, melamine resin, CTU guanamine (3,9-bis[2-(3,5-diamino-2,4,6-triazaphenyl)ethyl]-2,4,8,10-tetraoxaspiro[5,5]undecane), CMTU guanamine (3,9-bis[1-(3,5-diamino-2,4,6-triazaphenyl)methyl]-2,4,8,10-tetraoxaspiro[5,5] undecane) and the like.

Further, the (e) components are preferably any of carbonate, hydrogencarbonate, aliphatic carboxylate, unsaturated aliphatic carboxylate or aromatic carboxylate salts of alkali metal elements or alkali earth metal elements or hydrates thereof. Specifically, the (e) components may include, but not limited to, lithium carbonate, anhydrous sodium carbonate, sodium carbonate monohydrate, sodium carbonate decahydrate, potassium carbonate, rubidium carbonate, cesium carbonate, magnesium carbonate, calcium carbonate, barium carbonate, lithium hydrogencarbonate, sodium hydrogencarbonate, potassium hydrogencarbonate, cesium hydrogencarbonate, lithium formate monohydrate, sodium formate, potassium formate, rubidium formate, cesium formate, magnesium formate, calcium formate, barium formate, lithium acetate, sodium acetate, sodium acetate trihydrate, potassium acetate, rubidium acetate, cesium acetate, magnesium acetate, calcium acetate monohydrate, magnesium acetate tetrahydrate, barium acetate, sodium laurate, potassium laurate, lithium palmitate, sodium palmitate, potassium palmitate, magnesium palmitate, calcium palmitate, lithium stearate, sodium stearate, potassium stearate, magnesium stearate, calcium stearate, sodium gluconate, potassium gluconate, lithium lactate, sodium lactate, potassium lactate, lithium oxalate, sodium oxalate, potassium oxalate monohydrate, lithium succinate, monosodium succinate, disodium succinate, disodium succinate hexahydrate, dipotassium succinate, disodium adipate, dipotassium adipate, sodium gluconate, potassium gluconate, lithium lactate, sodium lactate, potassium lactate, disodium malate ½ hydrate, disodium malate trihydrate, dilithium tartrate monohydrate, disodium tartrate dihydrate, potassium hydrogen tartrate, dipotassium tartrate, potassium sodium tartrate tetrahydrate, sodium rubidium tartrate, lithium citrate tetrahydrate, monosodium citrate, disodium citrate, trisodium citrate, trisodium citrate dihydrate, sodium aspartate monohydrate, disodium glutamate monohydrate, sodium acrylate, potassium acrylate, sodium sorbate, potassium sorbate, monosodium fumarate, lithium benzoate, sodium benzoate, potassium benzoate, cesium benzoate, potassium hydrogen phthalate, lithium salicylate monohydrate, sodium salicylate, potassium salicylate and the like.

Considering industrial availability and the like, the (e) components are preferably lithium carbonate, anhydrous sodium carbonate, sodium carbonate monohydrate, sodium carbonate decahydrate, potassium carbonate, magnesium carbonate, calcium carbonate, barium carbonate, lithium hydrogencarbonate, sodium hydrogencarbonate, potassium hydrogencarbonate, lithium formate monohydrate, sodium formate, potassium formate, magnesium formate, calcium formate, barium formate, lithium acetate, sodium acetate, sodium acetate trihydrate, potassium acetate, calcium acetate monohydrate, magnesium acetate tetrahydrate, barium acetate, sodium laurate, potassium laurate, sodium palmitate, potassium palmitate, lithium stearate, sodium stearate, potassium stearate, magnesium stearate, calcium stearate, monosodium succinate, disodium succinate, disodium succinate hexahydrate, dipotassium succinate, lithium citrate tetrahydrate, monosodium citrate, trisodium citrate, trisodium citrate dihydrate, sodium aspartate monohydrate, disodium glutamate, sodium acrylate, potassium acrylate, sodium sorbate, potassium sorbate, monosodium fumarate, lithium benzoate, sodium benzoate, potassium benzoate, potassium hydrogen phthalate, lithium salicylate monohydrate, sodium salicylate, potassium salicylate.

Further, considering the hue of the polyacetal copolymer after deactivating the polymerization catalyst (c), the (e) components are more preferably sodium formate, sodium acetate, anhydrous sodium carbonate, sodium carbonate monohydrate, sodium carbonate decahydrate, sodium hydrogencarbonate, disodium succinate hexahydrate, sodium laurate, sodium palmitate, sodium stearate and the like.

In the present invention, the salts (e) represented by the above general formula (2) may be used alone or in combination of two or more, and may even be in forms of mixtures and double salts thereof.

Examples of a double salt may include sodium sesquicarbonate consisting of sodium carbonate and sodium hydrogencarbonate.

There is no particular limitation for the contents of the (e) components, but preferably, the contents are appropriately adjusted depending on (i) the amount of a catalyst remained in a polymer, (ii) the types and amounts of unstable terminal groups generated under polymerization conditions, (iii) the degree of the activities of the (e) components and treatment conditions (temperature, time, contact velocity and the like) and the like. Specifically, the contents of the (e) components are preferably very small, preferably 0.002 to 700 milliequivalents relative to 1 kg of a crude polyacetal copolymer obtained from a copolymerization reaction.

In a case where the contents of the (e) components are 1.0 or less milli-equivalent relative to 1 kg of a crude polyacetal copolymer, a value of 2.0 or less can be achieved for the b value of a polyacetal copolymer after deactivation of a polymerization catalyst (c).

Excessive contents of the (e) components are not preferred because the hue of a polyacetal copolymer after deactivating a polymerization catalyst (c) may be deteriorated. Too small contents of the (e) components are also not preferred because the efficiency of deactivation or the stabilization of unstable terminal ends may not be sufficiently achieved.

When at least one of the (e) components is added as described above, the trace amount of the at least one of the (e) components suffices for uniform dispersion throughout it. As a result, a value of 2.0 or less as measured with a color difference meter can be achieved for the b value of a polyacetal copolymer after deactivation of a polymerization catalyst (c). Note that the b value used herein is measured using a color difference meter SE-2000 (Nippon Denshoku Industries Co., Ltd.) as follows: a predetermined amount of pellets are placed in a pellet measurement cell (a round cell), and mounted on a sample stage, and covered with a cover to read a displayed value.

[Melt-Kneading of Post-Ground Crude Polyacetal Copolymer (d2) and Basic Compound (e)]

There is no particular limitation for the melt-kneading processing machine, but it is preferably one having a function of kneading a molten copolymer and preferably a venting function. Examples include single-axis or multi-axes continuous extruder-kneaders and co-kneaders each having at least one venting hole. According to the present invention, the polymerization catalyst is completely deactivated, and unstable terminal ends are reduced and stabilized in the melt-kneading treatment.

The melt-kneading treatment is preferably performed in a temperature range of from the melting point of a copolymer to 260° C. A temperature of higher than 260° C. is not preferred because a polymer may be deteriorated and decomposed.

In the present invention, the aforementioned melt-kneading treatment is preferably performed in the presence of an antioxidizing agent. As an antioxidizing agent, materials known as stabilizers for conventional polyacetal resins, for example, various types of hindered phenol antioxidizing agents and the like may be used. Representative examples include 2,6-di-t-butyl-4-methyl phenol, triethyleneglycol-bis[3-(3-t-butyl-5-methyl-4-hydroxyphenyl)propionate], 1,6-hexanediol-bis-[3-(3,5-di-t-butyl-4-hydroxyphenyl)propionate], tetrakis[3-(3,5-di-t-butyl-4-hydroxyphenyl)propionate]methane, N,N'-hexamethylenebis(3,5-di-t-butyl-4-hydroxyhydrocinamido), 2-t-butyl-6-(3'-t-butyl-5'-methyl-2'-hydroxybenzyl)-4-methylphenyl acrylate, 3,9-bis[2-{(3-t-butyl-4-hydroxy-5-methylphenyl)propionyloxy}-1,1'-dimethylethyl]-2,4,8,10-tetraoxaspiro[5,5]-undecane and the like. Note that these hindered phenol antioxidizing agents may be pre-added in a partial or entire amount to a main monomer or a comonomer before polymerization, and then polymerization may be performed. Further, these hindered phenol antioxidizing agents do not cause any deleterious effect on the activity of a polymerization catalyst unless they are not added in particularly excessive amounts. This is a preferred embodiment.

Further, any of materials known as stabilizers for various polyacetal resins may be added at this stage without causing any problem. Furthermore, for example, an inorganic filler such as glass fiber, a crystallization promoter (a nucleating additive), a parting agent, an anti-oxidant may be added.

As described above, at least one of the (e) components is added as a deactivating/stabilizing agent to a crude copolymer. After performing melt-kneading treatment, a formaldehyde gas generated due to decomposition, unreacted monomers and oligomers, the deactivating/stabilizing agent and the like are usually removed from an extruder through a vent part under reduced pressure to form pellets and the like, thereby obtaining a product for resin processing. Pellets are dried if desired. If drying is desired, they are dried at 135° C. for about 4 hours.

EXAMPLES

Below, the present invention will be specifically described with reference to Examples, but the present invention shall not be limited to these.

TABLE 1

| | | Example | | | |
|---|---|---|---|---|---|
| | | 1 | 2 | 3 | 4 |
| Copolymerization step | Polymerization catalyst | C1 | C1 | C2 | C2 |
| | Amount of polymerization catalyst(ppm) | 2 | 2 | 4 | 4 |
| | Copolymerization temperature | 80° C., 115° C.~140° C. | 80° C., 115° C.~140° C. | 80° C., 115° C.~140° C. | 80° C., 115° C.~140° C. |
| Grinding step | | Yes | Yes | Yes | Yes |
| Deactivation step | Basic compound (e) | E1 | E2 | E3 | E4 |
| | Amount of (e) component | 10 | 10 | 20 | 20 |

| | | Example | | |
|---|---|---|---|---|
| | | 5 | 6 | 7 |
| Copolymerization step | Polymerization catalyst | C1 | C1 | C1 |
| | Amount of polymerization catalyst(ppm) | 2 | 2 | 2 |
| | Copolymerization temperature | 80° C., 115° C.~140° C. | 80° C., 115° C.~140° C. | 80° C., 115° C.~140° C. |
| Grinding step | | Yes | Yes | Yes |
| Deactivation step | Basic compound (e) | E5 | E6 | E7 |
| | Amount of (e) component | 10 | 25 | 500 |

TABLE 2

|  |  | Comparative Example | | | |
|---|---|---|---|---|---|
|  |  | 1 | 2 | 3 | 4 |
| Copolymerization step | Polymerization catalyst (c) | C1 | C1 | C1 | C3 |
|  | Amount of polymerization catalyst (ppm) | 2 | 2 | 2 | 20 |
|  | Copolymerization temperature | 80° C., 80° C. | 80° C., 115° C.~140° C. | 80° C., 115° C.~140° C. | 80° C., 80° C. |
| Grinding step |  | Yes | No | No | Yes |
| Deactivation step | Basic compound (e) | E2 | E6 | E7 | E7 |
|  | Amount of (e) component (ppm) | 10 | 10 | 500 | 1000 |

The polymerization catalysts (c) in Tables 1 and 2 are as follows.
C1: Phosphotungstic acid (a heteropolyacid)
C2: Paratungstic acid (an isopolyacid)
C3: Boron trifluoride
The basic compounds (e) in Tables 1 and 2 are as follows.
E1: Sodium formate
E2: Sodium carbonate
E3: Sodium bicarbonate
E4: Sodium laurate
E5: Sodium stearate
E6: calcium stearate
E7: Melamine Examples 1-7

[Copolymerization of Trioxane as Main Monomer (a) and Cyclic Ether and/or Formal as Comonomer (b)]

A biaxial continuous polymerization machine was used as a polymerization reaction apparatus. In this polymerization machine, a jacket is attached to the outside through which a heating or cooling medium flows, and inside which two rotational axes with a large number of agitation and propulsion paddles are provided along the longitudinal direction. A mixed liquid containing 1000 ppm of methylal as a chain transfer agent and comprising 96.2 parts by weight of trioxane as a main monomer (a) and 3.8 parts by weight of 1,3-dioxolane (DOXO) as a comonomer (b) was continuously fed to the jacket of the above biaxial polymerization machine through its one end at an environmental temperature of between 115° C. or more and less than 140° C. while rotating the two rotational axes at a certain rate. At the same time, a solution of methyl formate containing 0.3 parts by weight of a polymerization catalyst (c) shown in Table 1 was continuously added to the above mixed liquid at an amount shown in Table 1 relative to the total monomers to perform polymerization. The addition amounts of polymerization catalysts shown in Table 1 are concentrations by weight (unit: ppm) relative to the total of the entire monomers.

[Grinding of Pre-Ground Crude Polyacetal Copolymer (d1)]

The reaction production from copolymerization (the pre-ground crude polyacetal copolymer (d1)) was passed through a dry grinder mill to obtain a crude polyacetal copolymer (d2).

[Deactivation of Polymerization Catalyst (c)]

Subsequently, the post-ground crude polyacetal copolymer (d2) was discharged from a discharging outlet provided in the other end of the polymerization machine, and a basic compound (e) shown in Table 1 was added in order to deactivate the polymerization catalyst (c). The amounts of the basic compounds (e) shown in Table 1 are concentrations by weight (unit: ppm) relative to the total of the entire monomers.

Subsequently, 0.3 parts by weight of triethyleneglycol bis[3-(3-t-butyl-5-methyl-4-hydroxyphenol)propionate] was added as an antioxidizing agent, and melt-kneaded and extruded with a biaxial extruder with a vent at a temperature of 220° C. under a degree of vacuum of 5 mmHg at the vent part. Pellets of the polymerization catalyst-deactivated polyacetal copolymers (d3) according to Examples 1 to 7 were prepared through the above steps.

Not that in order to prevent the moisture content of a polyacetal copolymer in the entire reaction apparatus from increasing, the apparatus is basically a closed system, and each of polymerizing, grinding and deactivating steps was performed under such an environment that penetration of moisture from the external environment can be prevented.

Comparative Example 1

Pellets of a post-ground crude polyacetal copolymer (d2)' according to Comparative Example 1 and a polymerization catalyst-deactivated polyacetal copolymer (d3)' according to Comparative Example 1 were prepared by the same approach as in Example 1 except that polymerization was performed at a polymerization environmental temperature of 100° C. or less.

Comparative Example 2

Pellets of a pre-ground crude polyacetal copolymer (d1)' according to Comparative Example 2 and a polymerization catalyst-deactivated polyacetal copolymer (d3)' according to Comparative Example 2 were prepared by the same approach as in Example 1 except that the reaction product (the pre-ground crude polyacetal copolymer (d1)') from copolymerization was discharged from a discharge outlet provided at the other end of a polymerization machine without passing the reaction product through a sieve having an opening of 11.2 mm.

Comparative Example 3

Pellets of a pre-ground crude polyacetal copolymer (d1)' according to Comparative Example 3 and a polymerization catalyst-deactivated polyacetal copolymer (d3)' according to Comparative Example 3 were prepared by the same approach as in Example 1 except that polymerization was performed at a polymerization environmental temperature of 100° C. or less, and the reaction product (the pre-ground crude polyacetal copolymer (d1)') from copolymerization was discharged from a discharge outlet provided at the other end of a polymerization machine without passing the reaction product through a sieve having an opening of 11.2 mm.

Comparative Example 4

Pellets of a post-ground crude polyacetal copolymer (d2)' according to Comparative Example 4 and a polymerization catalyst-deactivated polyacetal copolymer (d3)' according to Comparative Example 4 were prepared by the same approach as in Example 1 except that boron trifluoride was used as a polymerization catalyst (c), and polymerization was performed without heating a biaxial polymerization machine from the outside.

<Evaluation>

The post-ground crude polyacetal copolymers according to Examples and Comparative Examples (the pre-ground crude polyacetal copolymers in the case of Comparative Examples 2 and 3) were measured for the content of moisture, the amount of trioxane, the proportion of a group of particles each having a particle diameter of 11.2 mm or less contained in the groups of particles of a crude polyacetal copolymer and the amount of unstable termini. Further, the pellets of the polymerization catalyst-deactivated polyacetal copolymers according to Examples and Comparative Examples were dried under conditions of 135° C. and for 4 hours, and then the melt index (MI), the rate of alkali decomposition, the amount of released formaldehyde, the hue of a polyacetal copolymer after deactivation of the polymerization catalyst (c) and the amount of unstable termini were determined.

[Crude Polyacetal Copolymer]
[Evaluation of Moisture Content Contained in Crude Polyacetal Copolymer]

The contents of moisture contained in crude copolymers were quantified when measured under conditions of nitrogen flow at 300 mL/min. at 100° C. with a Karl-Fisher moisture meter CA-200 (Mitsubishi Chemical Analytech Co., Ltd.) using 1.0 g of samples from Examples and Comparative Examples. Results are shown in Tables 3 and 4.

[Evaluation of Trioxane Content Contained in Crude Polyacetal Copolymer]

The amounts of trioxane were evaluated with a gas chromatography system GC-2014ATF (Shimadzu Corporation). For each of 40 g samples according to Examples and Comparative Examples was placed and sealed in a cylinder along with 20 mL of distilled water, and heated on an oil bath under conditions of 100° C. and for 4 hours to extract trioxane. Then, the amount of trioxane contained in a crude copolymer was quantified as measured with the gas chromatography system. Results are shown in Tables 3 and 4.

[Proportion of the Group of Particles Each Having a Particle Diameter of 11.2 mm or Less Contained in the Groups of Particles Contained a Crude Polyacetal Copolymer]

Samples according to Examples and Comparative Examples were each screened with a sieve having an opening of 11.2 mm to determine a through-sieve proportion relative to 100 parts by weight of a corresponding sample. Results are shown in Tables 3 and 4.

[Amount of Unstable Termini of Crude Polyacetal Copolymer]

The amounts of unstable termini were evaluated in accordance with the following approach.

About 1 g of a sample was precisely weighed, and placed in a pressure tight container along with 100 ml of 60 vol % aqueous methanol containing 15 mg of calcium hydroxide and 0.5 vol % ammonium hydroxide, and heated at 170° C. for 60 minutes, and then cooled and opened to remove the content. The amount of formaldehyde generated due to decomposition of unstable terminal portions and dissolved in the solution was quantified in accordance with JIS JISK0102.29.1, the absorptiometric method for acetyl acetone, to calculate a proportion in terms of parts by weight relative to the sample. Results are shown in Tables 3 and 4.

[Polymerization Catalyst-Deactivated Polyacetal Copolymer]
[Evaluation of Melt Index (MI)]

The polymerization catalyst-deactivated polyacetal copolymers according to Examples and Comparative Examples were each subjected to measurements with a melt-index measuring device Melt Indexer model L202 (Takara Thermistor Co. Ltd.) with a load of 2.16 kg at a temperature of 190° C. to obtain a melt index (g/10 min). Results are shown in Tables 3 and 4. In the present Examples, the melt index (MI) was interpreted as a characteristic value reflecting a molecular weight. That is, it was read as a lower MI means a higher molecular weight and vice versa.

[Evaluation of Amount of Released Formaldehyde]

The polymerization catalyst-deactivated polyacetal copolymers according to Examples and Comparative Examples were each charged into a cylinder maintained at 200° C., and allowed to melt for 5 minutes. The molten material was then extruded from the cylinder into a closed container. Nitrogen gas was allowed to flow through the closed container, and formaldehyde contained in a flow-through nitrogen gas was dissolved and captured in water. Then the concentration of formaldehyde in water was measured to obtain the weight of formaldehyde released from the molten material. The weight of formaldehyde obtained above was divided by the weight of the molten material, thereby obtaining the amount of released formaldehyde (unit, ppm). Results are shown in Tables 3 and 4.

[Evaluation of Hue of Pellets]

The b values were measured as follows using a color difference meter SE-2000 (Nippon Denshoku Industries Co., Ltd.): predetermined amounts of pellets of the polymerization catalyst-deactivated polyacetal copolymers according to Examples and Comparative Examples were each placed in a pellet measurement cell (a round cell), and mounted on a sample stage, and covered with a cover to read a displayed b value. Results are shown in Tables 3 and 4.

[Amount of Unstable Termini of Polymerization Catalyst-Deactivated Polyacetal Copolymer]

The same approach as described in the section "Amount of unstable termini of crude polyacetal copolymer" was used to estimate the amount of unstable termini. Results are shown in Tables 3 and 4.

TABLE 3

| | | Example | | | | | | |
|---|---|---|---|---|---|---|---|---|
| | | 1 | 2 | 3 | 4 | 5 | 6 | 7 |
| Crude POM | Moisture content (Parts by weight) | 0.01 | 0.01 | 0.01 | 0.01 | 0.01 | 0.01 | 0.01 |
| | Trioxane content (Parts by weight) | 0.5 | 0.5 | 0.5 | 0.5 | 0.5 | 0.5 | 0.5 |
| | Particle diameter of 11.2 mm or less (Parts by weight) | 95 | 95 | 95 | 95 | 95 | 95 | 95 |

TABLE 3-continued

|  |  | Example | | | | | | |
|---|---|---|---|---|---|---|---|---|
|  |  | 1 | 2 | 3 | 4 | 5 | 6 | 7 |
|  | The amount of unstable termini (Parts by weight) | 0.6 | 0.6 | 0.6 | 0.6 | 0.6 | 0.6 | 0.6 |
| Extruded pellets | Melt index | 9.0 | 9.2 | 9.8 | 9.5 | 8.9 | 9.9 | 9.1 |
|  | Amount of released HCHO (ppm) | 30 | 25 | 44 | 48 | 32 | 56 | 79 |
|  | Hue (b value) | −0.1 | −0.4 | 0.1 | 0.0 | −0.3 | 0.2 | −0.2 |
|  | The amount of unstable termini (Parts by weight) | 0.2 | 0.2 | 0.2 | 0.2 | 0.2 | 0.4 | 0.3 |

TABLE 4

|  |  | Comparative Example | | | |
|---|---|---|---|---|---|
|  |  | 1 | 2 | 3 | 4 |
| Crude POM | Moisture content (Parts by weight) | 0.15 | 0.01 | 0.15 | 0.15 |
|  | Trioxane content (Parts by weight) | 1.5 | 0.5 | 1.5 | 1.5 |
|  | Particle diameter of 11.2 mm or less (Parts by weight) | 95 | 60 | 60 | 95 |
|  | The amount of unstable termini (Parts by weight) | 0.8 | 0.7 | 0.8 | 0.8 |
| Extruded pellets | Melt index | 10.5 | 11.3 | 12.0 | 12.5 |
|  | Amount of released HCHO (ppm) | 155 | 120 | 213 | 230 |
|  | Hue (b value) | 2.6 | 2.1 | 2.8 | 3.2 |
|  | The amount of unstable termini (Parts by weight) | 0.8 | 0.8 | 0.9 | 1.0 |

Because a nonvolatile protonic acid is used as a polymerization catalyst (c) in the present invention, a high polymerization yield can be obtained even in extremely small quantity of it. Further, the polymerization environmental temperature is maintained at 100° C. or less until the copolymerization temperature convention percentage reaches 50%, and thereafter in the range of between 115° C. or more and 140° C. or less. The pre-ground crude polyacetal copolymer (d1) is then ground with a dry grinder mill. This can allow the post-ground crude polyacetal copolymer (d2) to have a content of unreacted trioxane of 1.0 parts by weight or less, and comprise 90 parts by weight or more of particles each having a particle diameter of 11.2 mm or less relative to the particle groups. The content of moisture was controlled within a range of 0.1 or less parts by weight.

In addition, according to the present invention, a basic compound (e), specifically, a triazine ring-containing compound having an amino group or a substituted amino group, a carbonate, hydrogencarbonate or carboxylate salt of an alkali metal element or an alkali earth metal element or a hydrate thereof is added to a post-ground crude polyacetal copolymer (d2), and melt-kneaded to deactivate a polymerization catalyst (c) and also stabilize unstable termini. This can provide super high quantity polyacetal copolymers as commercial products (Examples 1 to 7).

Meanwhile, in a case where the copolymerization temperature is not appropriately controlled, a crude polyacetal copolymer having a content of unreacted trioxane of 1.0 or less parts by weight cannot be obtained. As a result, even when a basic compound (e) is added to the crude polyacetal copolymer to stabilize unstable termini, a value of the melt index is 10.0 g/10 min or more, and the b value of pellets is 2.0 or more. Further, the amount of released formaldehyde cannot meet a satisfactory quality level Comparative Examples 1 and 4

Similarly, in a case where a crude polyacetal copolymer is not ground after copolymerization, simply adding a basic compound (e) to the crude polyacetal copolymer to stabilize unstable termini results in a melt index of 10.0 g/10 min or more and a b value for pellets of 2.0 or more. Further, the amount of released formaldehyde cannot meet a satisfactory quality level (Comparative Examples 2 and 3).

Moreover, in a case where boron trifluoride is used as a polymerization catalyst, a large amount of a deactivating agent is required for deactivating the polymerization catalyst. Nonetheless, the value of the melt index is 10.0 g/10 min or more, and the b value for pellets is 2.0 or more. Further, the amount of released formaldehyde cannot meet a satisfactory quality level (Comparative Examples 4).

The invention claimed is:

1. A method of manufacturing a polyacetal copolymer, the method comprising: a copolymerization step of copolymerizing trioxane as a main monomer (a) and a cyclic ether and/or cyclic formal having at least one carbon-carbon bond as a comonomer (b) in the presence of a nonvolatile protonic acid as a polymerization catalyst (c) to obtain a crude polyacetal copolymer (d1), a grinding step of obtaining a crude polyacetal copolymer (d2) using a dry grinder mill, the crude polyacetal copolymer (d2) having a through-sieve proportion of 90 parts by weight or more when screened with a sieve having an opening of 11.2 mm, relative to 100 parts by weight of the crude polyacetal copolymer (d2) subjected to the screening, a deactivation step of deactivating the polymerization catalyst (c) by adding a basic compound (e) to the post-ground crude polyacetal copolymer (d2), and melt-kneading the mixture to obtain a polymerization catalyst-deactivated polyacetal copolymer (d3), wherein the temperature during the copolymerization is such that a polymerization environmental temperature is maintained at 100° C. or less until a conversion percentage reaches 50%, and thereafter is maintained in a temperature range of between 115° C. or more and 140° C. or less.

2. The method of manufacturing a polyacetal copolymer according to claim 1, wherein the nonvolatile protonic acid comprises at least one selected from the group consisting of heteropolyacids, isopolyacids, and acid salts thereof.

3. The method of manufacturing a polyacetal copolymer according to claim 2, wherein the nonvolatile protonic acid comprises a heteropolyacid represented by the following general formula (1) or an acid salt thereof:

$$H_x[M_m \cdot M'_n O_l] \cdot yH_2O \tag{1},$$

wherein in the general formula (1), M represents a central element selected from the group consisting of P and/or Si, and M' represents one or more coordinating elements selected from the group consisting of W, Mo and V; and l is 10 to 100, and m is 1 to 10, and n is 6 to 40, and x is 1 or more, and y is 0 to 50.

4. The method of manufacturing a polyacetal copolymer according to claim 2, the heteropolyacid or an acid salt thereof comprises at least one compound selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

5. The method of manufacturing a polyacetal copolymer according to claim 2, wherein the nonvolatile protonic acid comprises an isopolyacid represented by the following general formula (2) or (3) or an acid salt thereof:

$$xM^I_2O \cdot pM^V_2O_6 \cdot yH_2O \tag{2}$$

$$xM^I_2O \cdot pM^{VI}_2O_6 \cdot yH_2O \tag{3}$$

wherein in the general formulas (2) and (3), $M^I$ represents hydrogen optionally replaced with a metal in some occurrences;

$M^V$ represents one or more elements selected from the group consisting of V, Nb and Ta of the V group in the periodic table;

$M^{VI}$ represents one or more elements selected from the group consisting of Cr, Mo, W and U of the VI group in the periodic table; and p and x are 1 or more, and y is 0 to 50.

6. The method of manufacturing a polyacetal copolymer according to claim 2, wherein the isopolyacid or an acid salt thereof comprises at least one compound selected from the group consisting of paratungstic acid, metatungstic acid, paramolybdic acid, metamolybdic acid, paravanadic acid, metavanadic acid or acid salts thereof.

7. The method of manufacturing a polyacetal copolymer according to claim 1, wherein the comonomer (b) comprises at least one selected from the group consisting of 1,3-dioxolane, diethylene glycol formal, 1,4-butanediol formal, 1,3-dioxane or ethyleneoxide.

8. The method of manufacturing a polyacetal copolymer according to any one of claims claim 1, wherein the basic compound (e) comprises at least one selected from the group consisting of triazine ring-containing compounds having amino groups or substituted amino groups; carbonate, hydrogencarbonate or carboxylate salts of alkali metal elements or alkali earth metal elements and hydrates thereof.

9. The method of manufacturing a polyacetal copolymer according to claim 8, wherein the carbonate, hydrogencarbonate or carboxylate salt of an alkali metal element or an alkali earth metal element or a hydrate thereof comprises at least one selected from the group consisting of sodium formate, sodium acetate, sodium carbonate, sodium hydrogen carbonate, disodium succinate, sodium laurate, sodium palmitate, sodium stearate and calcium stearate.

10. The method of manufacturing a polyacetal copolymer according to claim, wherein the post-ground crude polyacetal copolymer (d2) has
   a content of moisture of 0.1 parts by weight or less relative to 100 parts by weight of the post-ground crude polyacetal copolymer (d2), and
   a content of unreacted trioxane of 1.0 part by weight or less relative to 100 parts by weight of the post-ground crude polyacetal copolymer (d2).

11. The method of manufacturing a polyacetal copolymer according to claim 1, wherein
   The amount of formaldehyde released from the polymerization catalyst-deactivated polyacetal copolymer (d3) is 100 ppm or less, and
   the b value of the polymerization catalyst-deactivated polyacetal copolymer is 2.0 or less as measured with a color-difference meter.

* * * * *